United States Patent [19]

Balducci et al.

[11] 4,390,374

[45] Jun. 28, 1983

[54] RUTILE ($TiO_2$) PIGMENTS COATED WITH (1) TRIGONAL ANHYDROUS ALUMINA ($Al_2O_3$) CUBIC METAL ALUMINATE ($MeAl_2O_4$) (Me=Co, Ni, Cu, Zn, Mg) AND PROCESS

[75] Inventors: Luigi Balducci, Mortara; Massimo Rustioni, Calusco D'Adda, both of Italy

[73] Assignee: Montedison S.p.A., Milan, Italy

[21] Appl. No.: 266,648

[22] Filed: May 26, 1981

[30] Foreign Application Priority Data

May 28, 1980 [IT]  Italy .................................. 22355 A/80

[51] Int. Cl.³ ............................ C09C 1/36; C09C 3/06
[52] U.S. Cl. ................................... 106/300; 106/306; 106/308 B; 427/315
[58] Field of Search ................... 106/300, 308 B, 306; 428/403

[56] References Cited

U.S. PATENT DOCUMENTS

| | | | |
|---|---|---|---|
| Re. 27,818 | 11/1973 | Werner | 106/300 |
| 2,559,638 | 7/1951 | Krchma et al. | 106/300 |
| 3,079,269 | 2/1963 | Chrest et al. | 106/300 |
| 3,450,550 | 6/1969 | Linton | 106/300 |
| 3,523,810 | 8/1970 | Swank | 106/300 |
| 3,748,165 | 7/1973 | Hill | 106/300 |
| 3,834,923 | 10/1974 | Hodgkin et al. | 106/300 |
| 4,050,951 | 9/1977 | Piccolo et al. | 106/300 |
| 4,097,300 | 6/1978 | Balducci et al. | 106/300 X |
| 4,227,935 | 10/1980 | Blake et al. | 106/308 B |

*Primary Examiner*—Helen M. McCarthy
*Attorney, Agent, or Firm*—Stevens, Davis, Miller & Mosher

[57] ABSTRACT

This invention relates to new inorganic pigments consisting or consisting essentially of a $TiO_2$ rutile nucleus, of a first adherent coating of trigonal $Al_2O_3$ and of a second adherent coating of cubic $MeAl_2O_4$, in which Me is Co, Ni, Cu, Zn or Mg. These pigments are obtained by mixing $TiO_2$ rutile particles coated with $Al_2O_3$, with a MeO oxide or a Me compound capable of providing MeO in a subsequent calcination step, and by calcining the mixture in the presence of air at temperatures in the range of from 750° to 1000° C.

7 Claims, 2 Drawing Figures

RUTILE (TiO₂) PIGMENTS COATED WITH (1) TRIGONAL ANHYDROUS ALUMINA (Al₂O₃) AND (2) CUBIC METAL ALUMINATE (MeAl₂O₄) (ME=Co, Ni, Cu, Zn, Mg) AND PROCESS

The present invention relates to new inorganic pigments based on metal aluminates and to a process for preparing same.

As is well known, pigments consisting of metal aluminates as such possess a low hiding power, wherefore their field of application is narrow.

U.S. Pat. No. 3,079,269 describes a process for preparing cobalt aluminate in the presence of TiO₂. It is possible in this way to obtain a blue pigment endowed with certain optical properties. The products obtained consist of more or less intimate mixtures of TiO₂ particles and CoAl₂O₄ particles. The latter, since they do not form on the TiO₂ particles a compact, thick and uniform coating, are easily detached from the TiO₂ nuclei under the mechanical action of grinding or dispersing the pigment in oil vehicles or in plastic materials. The resulting pigments are not endowed with good pigmenting properties. They are also defective as regards their applicative properties: in particular they are subject to chalking and do not disperse well in oil vehicles.

It is an object of the present invention to provide new inorganic pigments based on TiO₂ and metal aluminates in which the metal aluminate is bound to the TiO₂ particles in a perfectly adhering manner.

Another object of the invention is to provide new colored pigments, based on TiO₂ and colored aluminates, having good optical, pigmenting and applicative properties, particularly as regards chalking.

A further object of this invention is to provide new white pigments based on TiO₂ and white aluminates endowed with a high photostability.

A still further object is to provide a novel process suitable for preparing such pigments.

These and still other objects are achieved by the pigments of the present invention, based on TiO₂ and metal aluminates, which are characterized in that their particles consist or consist essentially of a TiO₂ rutile nucleus, a first adherent coating of trigonal Al₂O₃ and a second adherent coating of cubic MeAl₂O₄, in which Me is Co, Ni, Cu, Zn or Mg.

The MeAl₂O₄ coating has the crystalline structure of aluminum spinel.

The Al₂O₃ and MeAl₂O₄ coatings on the TiO₂ particles are not merely mechanical coatings. They are coatings of a chemical-physical nature, the exact structure of which is not thoroughly known. It is supposed that there is a penetration of the Al₂O₃ and MeAl₂O₄ layers into the TiO₂ particles, wherefore the resulting particles are morphologically and granulometrically undistinguishable from the starting TiO₂ particles. This particular structure insures the perfect adhesion of metal aluminate to the TiO₂ particles.

The pigment of the present invention can be represented by the general formula TiO₂·(x−y)Al₂O₃·yMeAl₂O₄ wherein x is greater than y.

The pigment according to this invention based on Co is blue; that based on Ni is greenish yellow; that based on Cu is grey. The pigments based on Zn and Mg are white. The preferred pigment is that based on Co.

The molar percent ratio of free Al₂O₃/TiO₂ in the pigment may vary, for example, from 0.65% to 47%. More generally, it varies from 2.8 to 21.1%.

The molar ratio in the pigment between MeO and total Al₂O₃ (i.e., free Al₂O₃ and Al₂O₃ in the form of aluminate) varies from 0.1 to 0.8. Preferably it varies from 0.5 to 0.8 in the colored pigments.

It is also an object of the present invention to provide a process for preparing the foregoing pigments, according to which particles of TiO₂ rutile coated with an adherent coating of Al₂O₃ are mixed with an MeO oxide or with an Me compound capable of yielding MeO in the subsequent calcination step, and then calcining the mixture, in the presence of air, at temperatures ranging from 750° to 1000° C.

The reaction is schematically represented as follows:

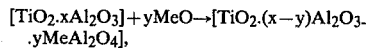
[TiO₂·xAl₂O₃]+yMeO→[TiO₂·(x−y)Al₂O₃·yMeAl₂O₄], in which x is greater than y.

It is necessary to use TiO₂ rutile particles with an adherent and compact coating of Al₂O₃. This coating can be obtained according to the process described in Italian Patent Application No. 19,157 A/80 filed on Jan. 11, 1980, and corresponding to U.S. Application Ser. No. 223,554, filed Jan. 9, 1981.

The process according to the aforesaid Italian patent application is characterized by the following steps:

(1) the surface of the TiO₂ rutile particles is activated, in a moving bed, preferably in a fluidized bed, by thermal treatment with an anhydrous gas at temperatures of from 400° to 600° C.;

(2) the particles are reacted in a moving bed, preferably in a fluidized bed, with AlCl₃, in the presence of a carrying gas, at temperatures ranging from 400° C. up to 700° C.; and (3) the particles are treated in a moving bed, preferably in a fluidized bed, with a gas containing water vapor, at temperatures between 200° and 400° C.

To prepare the particles of TiO₂-Al₂O₃ to be utilized in the present invention it is not necessary to carry out the third step just mentioned. One may work at 600° in both the first and second steps. The anhydrous gas of the first step and the carrying gas of the second step may be nitrogen.

The first step lasts from 15 minutes to 3 hours. Suitable reaction times in the second step range from 3.5 to 50 hours; if colored pigments are to be obtained, the reaction times preferably range from 14 to 40 hours for this second step.

It is not necessary to disaggregate the elementary TiO₂ particles by grinding in order to obtain a good Al₂O₃ coating on all the individual TiO₂ particles. TiO₂ produced either via sulphate or via chloride can be used. If TiO₂ via sulphate is used it is possible to employ the product coming from the calcining furnace: a screening to remove the fraction having a size exceeding 500μ is sufficient.

If the particles available (i.e., the granulates) are too small to be used in a fluidized bed, they must be granulated employing conventional techniques, for example in a Heinrich granulator.

When the sizes of the available TiO₂ particles are to be reduced or enlarged, it is preferable to bring their sizes to values ranging from 45 to 500μ, such values being the most suitable for treatment in fluidized beds. These values refer to the minimum and maximum sizes of the particles, not to their average diameter, which may be, for example, about 80–130μ.

The final product obtained by the process of the aforesaid Italian patent application consists or consists essentially of $TiO_2$ coated with $Al_2O_3$, which is characterized by the high adhesion of the coating to the particles. Furthermore, these coated particles practically retain the original shape of the $TiO_2$ particles.

In the process of the present invention, the average diameter of the elementary $TiO_2$ particles coated with $Al_2O_3$ (which is practically identical with the average diameter of the elementary particles of the starting $TiO_2$) ranges from 0.1 to $0.3\mu$. An important feature of the process consists in that the elementary granulometry and the morphology of the final product remain almost unchanged in respect of those of $TiO_2$ coated with $Al_2O_3$. Therefore, it is easy to check or control the granulometry and, in consequence, the desired optical and pigmenting properties through the elementary granulometry of the starting $TiO_2$ rutile.

In the starting particles based on $TiO_2$ and $Al_2O_3$ the percent molar ratio between $Al_2O_3$ and $TiO_2$ may vary from 3.3 to 52.3%. Preferably, it varies from 13.8 to 42.2% for the colored pigments and from 3.3 to 19.6% for the white pigments.

Starting products having a percent molar ratio higher than 52.3% are not convenient because the preparation of same according to the process of the aforesaid Italian patent application takes too long.

The relative amounts of the reagents, i.e. of MeO and of the $Al_2O_3$ which coats the $TiO_2$ particles, may vary over a wide range. To increasing molar ratios $MeO/Al_2O_3$ correspond products containing higher amounts of $MeAl_2O_4$ to the prejudice of $Al_2O_3$. Such molar ratios may vary from 0.1 to 0.8. Values exceeding 0.8 cannot be used, otherwise a reaction between $TiO_2$ and MeO would start with consequent formation of the corresponding titanates, which would cause dishomogeneity in the final product. If the molar ratio $MeO/Al_2O_3$ is lower than 0.1, the final product has a too low color saturation.

When colored pigments are to be prepared, it is preferable to employ a molar ratio $MeO/Al_2O_3$ between 0.5 and 0.8: in this range the best colorimetric properties are obtained and such properties tend to improve as the molar ratio increases. For white pigments it is preferable to use a ratio of from 0.1 to 0.3: these values insure a good photostability of the products.

The Me compounds capable of giving MeO in the subsequent calcination step are, for example, the hydroxides, the carbonates and the nitrates; in the case of Co and Zn also the sulphates may be used.

The mixing between the particles of $TiO_2$-$Al_2O_3$ and the Me compound can be carried out under dry or wet conditions. It is preferable to operate under wet conditions because a better mixing is attained. In this case, an aqueous dispersion of $TiO_2$-$Al_2O_3$ particles is prepared, for example, by wet-grinding in a ball mill or in a sand mill. During this operation the degree of aggregation of the particles is reduced until one obtains aggregates having sizes less than $40\mu$, and preferably less than $30\mu$.

The wet-mixing of the particles of $TiO_2$-$Al_2O_3$ with an Me compound is effected according to different techniques. It is possible:

(a) to add a soluble salt to the aqueous dispersion of the $TiO_2$-$Al_2O_3$ particles; then the dispersion is brought to dryness, for instance at 110°–130° C., and the mixture is then homogenized by means of dry mixers, such as for example mills;

(b) to add a soluble salt to the dispersion and subsequently, keeping the dispersion under stirring, to precipitate the corresponding hydroxides $Me(OH)_2$ or carbonates $MeCO_3$ by the addition of an alkaline hydroxide or $NH_3$ or an alkaline carbonate. At the end of the precipitation the pH is generally between 8 and 9 and preferably between 8 and 8.5. At the conclusion of the precipitation the hydroxide or the carbonate is filtered, washed and optionally dried at 110°–130° C. It is also possible to feed the filtration cake directly to the calcining furnace. As soluble salts of Me the hydroxides or carbonates of which are precipitated, it is possible to use, for example, the nitrates, the chlorides or the sulphates. NaOH is generally employed as the hydroxide; usually $Na_2CO_3$ is utilized as the alkaline carbonate.

Of the two techniques just described, that comprising the precipitation of the metals in the form of hydroxides or carbonates is preferably employed because it secures a better homogenization of the mixture.

As already explained, the starting mixture is calcined in the presence of air at temperatures ranging from 750° to 1000° C. At temperatures lower than 750° C., crystallization of the products may be incomplete, while at temperatures higher than 1000° C. particles-sintering phenomena may occur. The calcination is preferably conducted at temperatures of from 800° to 900° C.: in this temperature range products endowed with the best optical and pigmenting properties are obtained.

Calcination may be carried out in a conventional static or a rotary furnace. It is preferable to use a rotary furnace because this secures a better homogenization during the calcining step.

The duration of the calcining treatment may vary, for example, from 1 hour to 5 hours; more usually it varies from 1 hour to 3 hours.

In the pigments of the present invention the metal aluminate forms an indivisible unity with the elementary particles of $TiO_2$-$Al_2O_3$. Electron microscopy reveals that the elementary granulometry and morphology of the particles of $TiO_2$-$Al_2O_3$ remain nearly unchanged after the subsequent reaction with the metal oxide.

The blue pigments consisting or consisting essentially of $TiO_2$-$Al_2O_3$-$CoAl_2O_4$ exhibit very little chalking phenomenon since the $TiO_2$-$Al_2O_3$ and the cobalt aluminate are intimately bound to each other. In any event, any possibly occurring chalking phenomenon does not appreciably reduce the aesthetic value of the resulting paint since any pigment that could possibly appear on the surface is of the same color as the paint.

The uniform distribution of the color on the particles is advantageous also in other respects. In fact, in comparison with pigments having a similar chemical composition, as described in U.S. Pat. No. 3,079,269, the pigments of the present invention exhibit more intense blue shades and a higher tinting strength.

Furthermore, the uniform granulometry of the particles, which, besides, can be varied over a wide range ($0.1$–$0.3\mu$), imparts to this product better applicative properties, such as e.g. the dispersibility in paints and in plastic materials.

The white pigments based on Zn and Mg are endowed with a high photostability.

BRIEF DESCRIPTION OF THE FIGURES

FIG. 1 shows the pigment of Example 1;

and FIG. 2 shows the pigment of the prior art according to test 1A.

Figure 1:
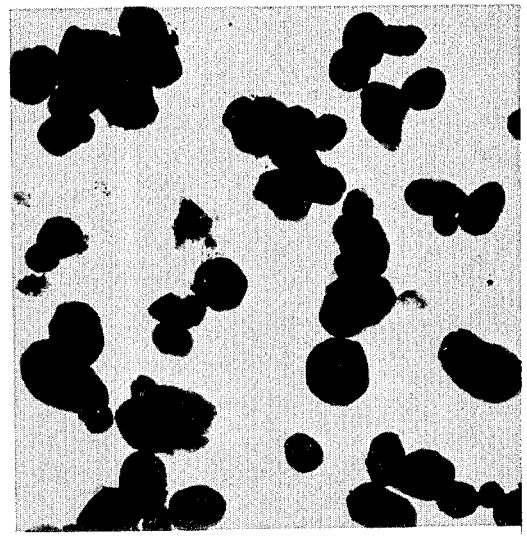
FIGS. 1 and 2 are electron photomicrographs at 40,000 enlargement.

The following examples are given in order still better to illustrate the inventive nature of the present invention.

EXAMPLE 1

The matrix $TiO_2 \cdot xAl_2O_3$ was prepared by following the procedures described in the above-mentioned Italian Patent Application No. 19,157 A/80.

Use was made of a discontinuous fluid bed reactor consisting of a quartz tube having an inside diameter of 4.5 cm and a disengaging height of 50 cm. This reactor was charged with 60 g of $TiO_2$ (99.9% rutile) and having an elementary granulometry characterized by a numeral geometrical mean diameter $d_g$ equal to 0.18–0.19μ and by a standard deviation from the mean diameter $\sigma_g$ equal to 1.37. The $TiO_2$ was obtained by the sulphate process and was withdrawn at the calcining furnace outlet. The product appeared in the form of aggregates having a mean diameter of 110μ.

The $TiO_2$ was subjected to a flow of 50 Nl/h of dry nitrogen for 2 hours at 600° C.; subsequently and always at 600° C., a gaseous mixture consisting of $N_2$ and $AlCl_3$, in which the $AlCl_3$ partial pressure was $1.46 \cdot 10^{-2}$ atm., was introduced. The treatment lasted about 14 hours and led to a prodduct containing 16.1% by weight of $Al_2O_3$ equivalent to a compound of empirical formula $TiO_2 \cdot 0.15Al_2O_3$. 40 g of this product were dispersed for 30 minutes under wet conditions in a laboratory vibrating shaking machine ("Red Devil" constructed by Palmerton) following these steps: 10 g of product, 40 g of glass balls of 2 mm φ, and 20 ml of $H_2O$ were introduced into 4 glass containers having a capacity of 80 ml each. At the conclusion of grinding the dispersed product was separated from the glass balls and a slurry in a ratio of 50 g/l in deionized water was prepared. To this slurry, maintained under stirring and at room temperature, 8.91 g of $CoSO_4 \cdot 7H_2O$ were added; after dissolution, cobalt hydroxide was precipitated with a 2 N ammonia solution. The pH of the slurry at the end of the precipitation was about 8.7.

The product was maintained under stirring for 10 minutes, then it was filtered and washed to remove the soluble salts. Subsequently the product was calcined for 1 hour at 850° C. in a muffle in the presence of air. At the end of the calcination the pigment was cooled and ground in an automatic mortar (Pulverisette of Fritsch) for 15 minutes.

The resulting product exhibited a blue shade and had the following molar composition referred to 100 mols of $TiO_2$:

total $Al_2O_3 = 15$; $CoO = 7.5$; $CoO/Al_2O_3 = 0.5$.

The diffractometric analysis revealed, besides $TiO_2$ (rutile) which constituted the prevailing phase, $CoAl_2O_4$ having a cubic structure and trigonal $Al_2O_3$. The elementary granulometry of the product was 0.18–0.19μ and remained almost unchanged in respect of the starting $TiO_2$.

By way of comparison, a pigment having a similar molar composition was prepared by following the procedure of Example 3, test 1, of U.S. Pat. No. 3,079,269, except for a few differences described hereinafter. More exactly, in test 1A, an aqueous slurry at 50 g/l of $TiO_2$ of which 99.9% was in rutile form (the same as utilized above in Example 1 but without any post-treatment with $Al_2O_3$) was prepared.

17.82 g of $CoSO_4 \cdot 7H_2O$ and 84.52 g of $Al_2(SO_4)_3 \cdot 18H_2O$ were added to the aqueous dispersion of the pigment prepared according to the procedures of Example 1 and containing 62.7 g of $TiO_2$. After dissolution, the slurry was rendered basic (to pH = 8.7) with a 2 N solution of $NH_3$; the product was then washed and filtered. The filtration cake was pulped again with water to which 0.67 g of $Na_2CO_3$, corresponding to 1% by weight referred to the $TiO_2$, were added.

After having been brought to dryness at 110° C., the product was calcined and ground according to the procedures described above in Example 1.

On the products of Example 1 above and of the comparative test 1A the following were determined:

chalking degree optical properties (luminosity (Y%), dominant wave length ($\lambda_D$), color saturation (% Pc))

dispersibility in oil vehicles tinting strength examination under the electron microscope.

To determine the chalking degree, an air-drying enamel was applied on aluminum sheets. The enamel consisted of 10 parts by weight of the pigment being tested and of 26.4 parts by weight of resin Resial 3118 produced by Montedison S.p.A., having the following composition:

linseed oil = 55%; phthalic anhydride = 29%;
pentaerythritol and glycols = 16%.

The specimens were exposed in the apparatus for a resistance-to-atmospheric-environment accelerated test "Weathermometer" of Atlas Electric Devices Co., model XW-WR. The duration of exposure was 300 hours corresponding to 12.5 continuous cycles of 24 hours, each consisting of:

hours of light: 24 hours of rain: 3(15 minutes of rain every 2 hours of light)

relative humidity: 70% temperature at light: 65° C.

At the end of the exposure cycles, the chalking degree was determined according to standard ASTM D 659-74. The value zero (0) of the scale corresponded to total chalking, a value (10) to no chalking.

The optical properties were determined on a dry paint film having a thickness of 50μ, prepared by dispersing in a Hoover kneading machine one part of pigment in one part of a vehicle having the following composition by weight:

Aroplaz 1279 (68% by weight of alkyd resin, 32% of soybean oil) produced by Alcrea: 76.3%

FL 30 (boiled linseed oil) produced by Ferri & Figli: 19.0%

Drying mixture: 4.7%

The drying mixture had the following composition by weight:

| Calcium naphthenate: | 1.77% |
| Zirconium naphthenate: | 5.31% |
| Cobalt naphthenate: | 6.9% |

| | |
|---|---|
| White spirit: | 86.02% |

Colorimetric determinations were made by a differential tristimulus colorimeter DUCOLOR model 220 of Neotec Instruments Corp. This apparatus gave tristimulus values X, Y, Z and reflectances $R_V$, $R_A$ and $R_B$, respectively, on the green, the amber, and the blue filters in respect of a standard apparatus calibrated to Mg oxide (standard S/N 22-197 of Neotec Corporation having $R_V=92.0$, $R_A=92.0$, $R_B=88.6$).

From the tristimulus values X, Y, Z provided by the apparatus, the trichromatic coordinates (x, y) were obtained and, graphically, the values of the dominant wave length ($\lambda_D$) and of the color saturation ($P_c\%$) were inferred.

Value $R_V$ coincides with luminosity Y%. To high values of Y%, a high value of luminosity corresponds.

The dispersibility in the oil vehicle was determined as follows: 12 g of pigment, 7 g of resin Resial 5132 of Montedison S.p.A., and 2.5 g of white spirit along with 30 g of glass balls having a diameter of about 2.5 mm were introduced into a 100 ml glass container. The resin Resial 5132 had the following composition:
- soybean oil: 65%;
- phthalic anhydride: 20%;
- pentaerythritol: 15%.

The whole was roughly mixed by a paddle, whereupon the container was placed into the vibrating shaking machine "Red Devil" of Palmerton.

At intervals of 15, 30 and 60 minutes a sample was withdrawn and the fineness of grinding was determined by means of a grindo-meter, according to standard ASTM D-1210-64. The values were expressed according to the Hegman scale. A good dispersibility corresponds to high values of the scale.

The qualitative evaluation of the tinting strength of the pigments was effected by visual comparison of paste applications obtained by mixing in a Hoover kneading machine one part of colored pigment with 3 parts of TiO2 and 3 parts of the same vehicle utilized for the determination of the optical properties.

The results of the quantitative determinations are recorded in Table 1:

TABLE 1

| Nature of the product | Chalking degree | Optical Properties | | | Dispersibility (Hegman unit) | | |
|---|---|---|---|---|---|---|---|
| | | Y % | $\lambda_D^{(nm)}$ | $P_c$ (%) | 15 min. | 30 min. | 60 min. |
| Example 1 | 8 | 37.2 | 477.1 | 33 | 2.6 | 4.5 | 6.0 |
| Test 1A | 5 | 42.8 | 477.0 | 27 | 0 | 0 | 1.8 |

Examining Table 1, one will notice that the pigment according to this invention is superior to that of the prior art as regards chalking, color saturation $P_c(\%)$, and dispersibility in the oil vehicle.

From a visual comparison of paste applications diluted with TiO2, one will notice that the pigment of the present invention also exhibits a higher tinting strength.

Figure 2:
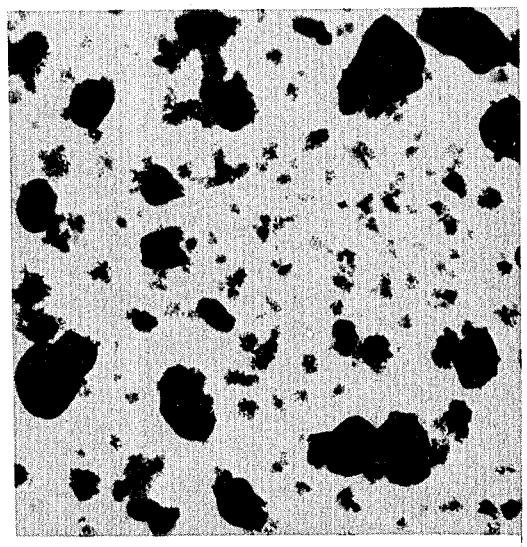

Electron photomicrographs at 40,000 enlargement were also made. FIG. 1 shows the pigment of Example 1; in this figure the cobalt aluminate layer is shown as so firmly adherent that it is impossible to distinguish it from the TiO2-Al2O3 particles. FIG. 2 shows the pigment of the prior art prepared according to test 1A: in this figure both the starting particles of TiO2 and the finer particles of cobalt aluminate may readily be observed.

EXAMPLES 2-3

Here the TiO2-Al2O3 matrix of Example 1 was utilized. The procedure described in Example 1 was followed, but varying the molar ratios CoO/Al2O3. The products were calcined 3 hours at 800° C.

In Example 2, only 40% of the total Al2O3 was converted into CoAl2O4, while in Example 3 the conversion was 70%. From Table 2 below one may infer that the products—the total Al2O3 being the same—exhibited color saturations which increased as the CoO content in the pigment increased.

TABLE 2

| Example | TiO2 (mols) | Al2O3 (mols) | CoO (mols) | Molar ratio CoO/Al2O3 | Y % | $\lambda_D^{(nm)}$ | % $P_c$ |
|---|---|---|---|---|---|---|---|
| 2 | 100 | 15.0 | 6.0 | 0.4 | 40.3 | 478.0 | 30.0 |
| 3 | 100 | 15.0 | 10.5 | 0.7 | 33.2 | 478.0 | 35.0 |

EXAMPLES 4-5-6

Using the same apparatus and the same titanium dioxide of Example 1, a TiO2 containing 30% by weight of Al2O3 was prepared. The time required by the treatment with AlCl3 was 35 hours. The product corresponded to the empirical formula TiO2.0.336 Al2O3.

On three portions of this matrix three treatments were effected by varying both the amount and the nature of the Co salt. The aqueous dispersion of post-treated TiO2, prepared according to the procedures of Example 1, was admixed with the desired amount of Co in the form of the nitrate (Examples 4 and 6) or the sulphate (Example 5).

The slurry was evaporated to dryness at 110° C.; the product, after homogenization in an automatic mortar for 15 minutes, was calcined at 1000° C. for 1 hour.

The results are recorded below in Table 3.

By comparing the results of Examples 4 and 5 one may infer that the use of Co in the form of the nitrate or the sulphate does not involve meaningful variations in the optical properties. Example 6, which refers to a product the Al2O3 content of which was converted to the extent of 80% into cobalt aluminate, provided a pigment having a color saturation superior to that of Example 4, in which Al2O3 was converted to the extent of 50% into CoAl2O4.

TABLE 3

| Example | TiO2 (mols) | Al2O3 (mols) | CoO (mols) | (salt) | Molar ratio CoO/Al2O3 | Y (%) | $\lambda_D^{(nm)}$ | $P_c$ (%) |
|---|---|---|---|---|---|---|---|---|
| 4 | 100 | 33.6 | 16.80 | nitrate | 0.5 | 30.5 | 477.0 | 40.0 |
| 5 | 100 | 33.6 | 16.80 | sulphate | 0.5 | 30.7 | 477.0 | 39.8 |

TABLE 3-continued

| Example | $TiO_2$ (mols) | $Al_2O_3$ (mols) | CoO (mols) | CoO (salt) | Molar ratio $CoO/Al_2O_3$ | Y (%) | $\lambda_D^{(nm)}$ | $P_c$ (%) |
| --- | --- | --- | --- | --- | --- | --- | --- | --- |
| 6 | 100 | 33.6 | 26.88 | nitrate | 0.8 | 23.8 | 476.0 | 48.0 |

EXAMPLES 7–8

Examples 7 and 8 establish that good results are achievable both with $TiO_2$-$Al_2O_3$ having rather large granulometry and with $TiO_2$-$Al_2O_3$ having rather small granulometry.

In Example 7 use was made of $TiO_2$ (rutile) having an elementary granulometry $d_g=0.27$–$0.28\mu$ and $\sigma_g=1.43$. Employing the same apparatus as in Example 1 and treating with $AlCl_3$ for 17 hours, a product was obtained which contained 18% by weight of $Al_2O_3$ corresponding to the following empirical formula: $TiO_2.0.172\ Al_2O_3$.

Subjected to granulometric analysis, the product was found to consist of particles having diameter $d_g=0.27\mu$ and standard deviation $\sigma_g=1.44$.

Following the procedures of Example 4, a composition was prepared characterized by a molar ratio $CoO/Al_2O_3$ equal to 0.5. The mixture was calcined 1 hour at 1000° C.

The results are recorded in Table 4.

In Example 8, use was made of a $TiO_2$ (rutile) having elementary granulometry $d_g=0.14$–$0.15\mu$ and $\sigma_g=1.55$. Utilizing the same apparatus as in Example 1, a product containing 17% by weight of $Al_2O_3$ was prepared by treating with $AlCl_3$ for 16 hours. The empirical formula of the product is $TiO_2.0.161\ Al_2O_3$.

This product was found to consist of elementary particles having diameter $d_g=0.14$–$0.15$ and standard deviation $\sigma_g=1.54$.

Following the procedures of Example 4, a composition characterized by a molar ratio $CoO/Al_2O_3$ equal to 0.5 was prepared. The mixture was calcined 1 hour at 1000° C.

The results are also reported in Table 4.

TABLE 4

| Example | $TiO_2$ (mols) | $Al_2O_3$ (mols) | CoO (mols) | Molar ratio $CoO/Al_2O_3$ | Y (%) | $\lambda_D$ (nm) | $P_c$ (%) |
| --- | --- | --- | --- | --- | --- | --- | --- |
| 7 | 100 | 17.2 | 8.60 | 0.5 | 35.1 | 476.0 | 33.0 |
| 8 | 100 | 16.05 | 8.03 | 0.5 | 32.3 | 476.0 | 36.0 |

EXAMPLES 9–12

The matrix $TiO_2.0.150\ Al_2O_3$ of Example 1 was utilized.

The pigment dispersion prepared according to the procedures described above in Example 1 was additioned with the desired amounts of Ni, Cu, Zn or Mg (respectively) in the form of the nitrates. It was brought to dryness whereupon, after having homogenized the product in an automatic mortar, calcination was effected at 900° C. for 3 hours.

The product, after cooling, was ground again in an automatic mortar for 15 minutes.

Compositions of the resulting products and the corresponding colors observed are recorded below in Table 5.

Independently of the tyype of MeO component the products were found to consist of $TiO_2$ rutile, trigonal $Al_2O_3$, and the compound $MeAl_2O_4$ having the cubic structure of aluminum spinel.

On microscopic examination the products obtained revealed a granulometry fully similar to that observed for the compounds based on cobalt spinel.

The coating of the $TiO_2$-$Al_2O_3$ with the foregoing compounds was found to be uniform and homogeneous.

TABLE 5

| Example | $TiO_2$ (mols) | $Al_2O_3$ (mols) | MeO type | MeO mols | Molar ratio $MeO/Al_2O_3$ | Color |
| --- | --- | --- | --- | --- | --- | --- |
| 9 | 100 | 15 | NiO | 7.5 | 0.5 | greenish yellow |
| 10 | 100 | 15 | CuO | 7.5 | 0.5 | grey |
| 11 | 100 | 15 | ZnO | 4.5 | 0.3 | white |
| 12 | 100 | 15 | MgO | 4.5 | 0.3 | white |

What is claimed is:

1. Inorganic pigments based on $TiO_2$ and metallic aluminates, characterized in that their particles consist of a $TiO_2$ rutile nucleus, a first adherent coating of trigonal $Al_2O_3$, and a second adherent coating of cubic $MeAl_2O_4$, in which Me is selected from the class consisting of Co, Ni, Cu, Zn and Mg.

2. A process for preparing a pigment according to claim 1, characterized in that $TiO_2$ rutile particles coated with an adherent coating of $Al_2O_3$ are mixed with an oxide MeO or a Me compound capable of providing MeO in a subsequent calcining step, and the mixture is calcined in the presence of air at temperatures ranging from 750° to 1000° C.

3. A process according to claim 2, characterized in that the percent molar ratio $Al_2O_3/TiO_2$ in the $TiO_2$ particles coated with $Al_2O_3$ ranges from 3.3 to 52.3%.

4. A process according to either of claims 2 or 3, characterized in that the molar ratio $MeO/Al_2O_3$ between the oxide MeO and the $Al_2O_3$ contained in the $TiO_2$ particles coated with $Al_2O_3$ is between 0.1 and 0.8.

5. A process according to either of claims 3 or 4, for preparing colored pigments, characterized in that the percent molar ratio $Al_2O_3/TiO_2$ is between 13.8 and 42.2% and the molar ratio $MeO/Al_2O_3$ is between 0.5 and 0.8.

6. A process according to claim 2 characterized in that the Me compound is $Me(OH)_2$ or $MeCO_3$ and in that the mixture of $TiO_2$ particles coated with $Al_2O_3$ and with such Me compound is prepared as follows: the $TiO_2$ particles coated with $Al_2O_3$ are dispersed in water; a soluble salt of Me is added to the dispersion and $Me(OH)_2$ or $MeCO_3$ is precipitated by means of an alkaline hydroxide or $NH_3$ or an alkaline carbonate, whereupon the slurry is filtered and the product is washed.

7. A process according to claim 2 characterized in that the calcination is effected at temperatures in the range of from 800° to 900° C.

* * * * *